(12) United States Patent  
Barnes

(10) Patent No.: US 7,611,595 B2
(45) Date of Patent: Nov. 3, 2009

(54) SYSTEM, METHOD, AND APPARATUS FOR METALLIC-COMPOSITE JOINT WITH COMPLIANT, NON-CORROSIVE INTERFACE

(75) Inventor: John E. Barnes, Roswell, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 495 days.

(21) Appl. No.: 11/345,473

(22) Filed: Feb. 1, 2006

(65) Prior Publication Data

US 2007/0175966 A1    Aug. 2, 2007

(51) Int. Cl.
*B32B 37/00*  (2006.01)

(52) U.S. Cl. .................... 156/148; 156/91; 244/123.1; 244/123.4; 244/123.5

(58) Field of Classification Search ........... 244/123.1, 244/123.4, 123.5; 52/762; 156/92, 148, 156/91; 228/122.1
See application file for complete search history.

(56) References Cited

U.S. PATENT DOCUMENTS

| | | | |
|---|---|---|---|
| 4,478,915 A * | 10/1984 | Poss et al. .................... 428/607 |
| 5,476,704 A | 12/1995 | Kohler ........................ 428/119 |
| 5,639,565 A * | 6/1997 | Boyd et al. .................. 428/628 |
| 5,906,400 A | 5/1999 | Gandy .......................... 285/55 |
| 6,106,960 A | 8/2000 | Fujii et al. .................. 428/627 |
| 6,280,584 B1 * | 8/2001 | Kumar et al. .......... 204/298.15 |
| 6,718,713 B2 | 4/2004 | McKague, Jr. et al. ... 52/309.13 |
| 6,897,123 B2 * | 5/2005 | Winther ....................... 438/455 |

* cited by examiner

*Primary Examiner*—Jeff H Aftergut
(74) *Attorney, Agent, or Firm*—Bracewell & Giuliani LLP

(57) ABSTRACT

A metallic-composite joint is formed by inserting a metallic member into a slot of a pi-shaped composite preform. The preform is formed from woven carbon fiber in a binder of resin and may or may not be cured prior to assembly. An inert compliant layer is located between the legs of the preform and the metallic member. The resin binder or an adhesive is used to bond the compliant layer to the preform. The compliant layer has a coefficient of thermal expansion that more closely matches that of the preform. The properties of the compliant layer also avoid galvanic corrosion between the carbon in the preform and the metallic member.

16 Claims, 2 Drawing Sheets

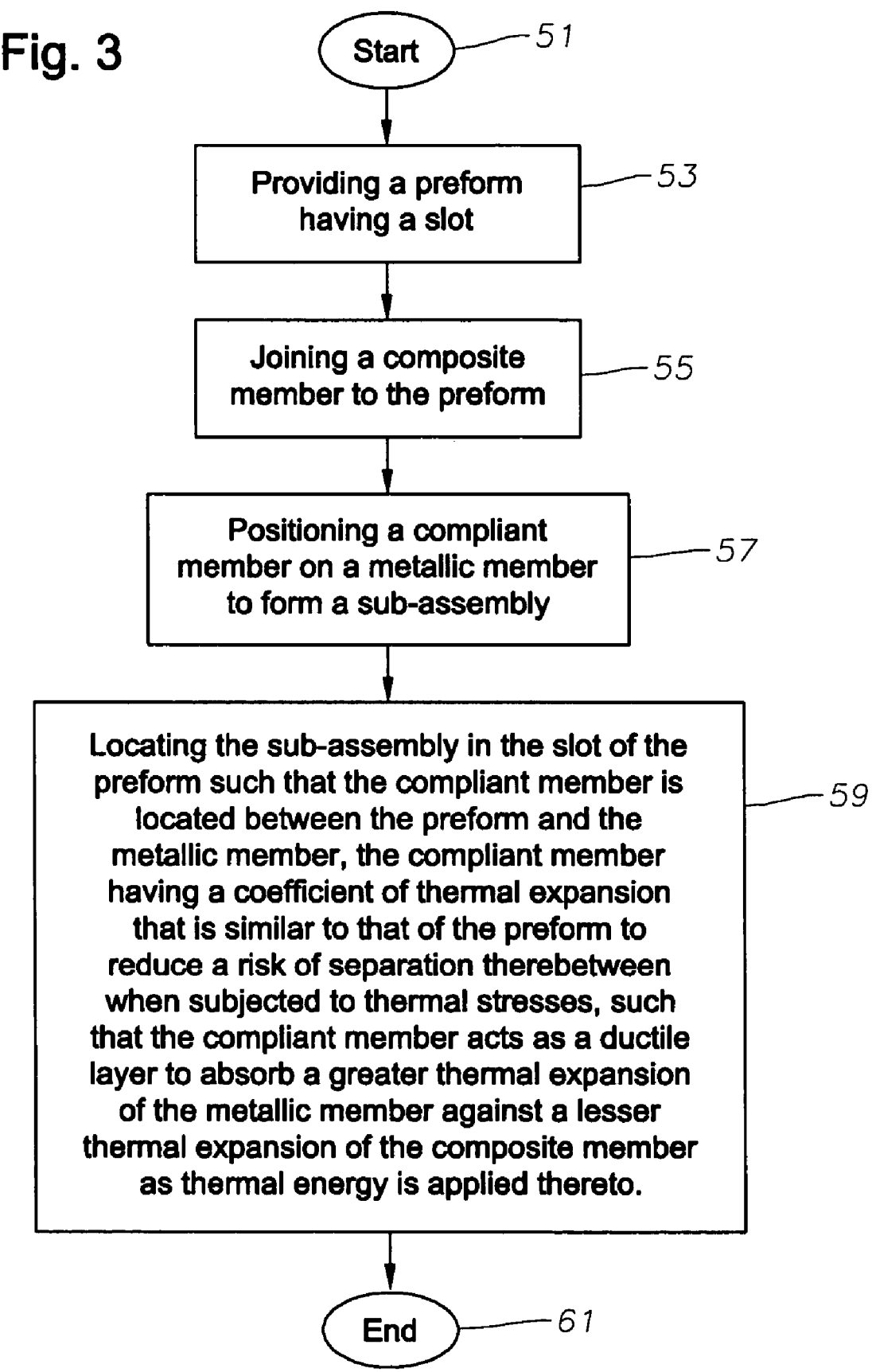

SYSTEM, METHOD, AND APPARATUS FOR METALLIC-COMPOSITE JOINT WITH COMPLIANT, NON-CORROSIVE INTERFACE

BACKGROUND OF THE INVENTION

1. Technical Field

The present invention relates in general to joining dissimilar materials at a structural interface and, in particular, to an improved system, method, and apparatus for forming a compliant, non-corrosive interface between metallic and composite materials.

2. Description of the Related Art

Joining dissimilar materials such as metallic and composite components is a difficult and tedious process. There are many well known techniques for joining or forming joints between metallic materials. In the aerospace industries, composite components may be joined with prefabricated or preformed pi-shaped joints. For example, U.S. Pat. No. 6,718,713 to McKague describes a structural member having a planar base with two longitudinal legs extending in parallel from the base. A channel is defined between the legs for insertion of a flat plate that forms the first member of the structural member. The base of the preform is bonded to a composite member. The preform is a composite material having continuous filaments of woven or braided fiber. The preform is impregnated with a thermoset resin that bonds the first member to the second member of the structural member.

However, pi-shaped joints have not been used successfully to form metallic-to-composite joints because of thermal expansion mismatch and galvanic corrosion. Most metals have a significantly greater coefficient of thermal expansion than composite materials. Moreover, galvanic corrosion occurs when the following three conditions are met: (1) electrochemically dissimilar materials are used; (2) an electrically conductive path exists between the dissimilar materials; and (3) a conductive path exists for the ions to move from the more anodic material to the more cathodic material. One solution to these problems is described in the McKague patent referenced above. That patent uses filaments in the legs having a coefficient of expansion to match the plate, and filaments in the base having a coefficient of expansion to match the panel. Although that design is workable, an improved solution for forming a joint between metallic and composite materials would be desirable.

SUMMARY OF THE INVENTION

One embodiment of a system, method, and apparatus of the present invention comprises a metallic member, such as aluminum, joined to a composite panel, such as a frame member of an aircraft. The metallic member inserts into a slot of a pi-shaped composite preform. In one embodiment, the preform is woven and formed from woven carbon fiber in a binder of resin. The preform may or may not be cured prior to assembly.

An inert compliant layer, such as titanium, is located between the legs of the preform and the metallic member. The compliant layer may be a sleeve-type member, coated on the metallic member, or applied by various other known techniques prior to insertion into the preform. The compliant layer also may be discontinuous. The resin binder or an adhesive may be used to bond the compliant layer to the preform. Advantageously, the compliant layer acts as a barrier to galvanic corrosion that might otherwise occur between the carbon in the preform and the metallic member. In addition, the compliant layer has a coefficient of thermal expansion that more closely matches that of the preform to reduce the risk of separation therebetween when subjected to thermal stresses. For example, the compliant layer primarily acts as a ductile layer to absorb the greater expansion of the metal against the lesser expansion of the composite as thermal energy is applied.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

FIG. 3 is a high level flow diagram of one embodiment of a method constructed in accordance with the present invention.

DETAILED DESCRIPTION OF THE INVENTION

Figure 1:
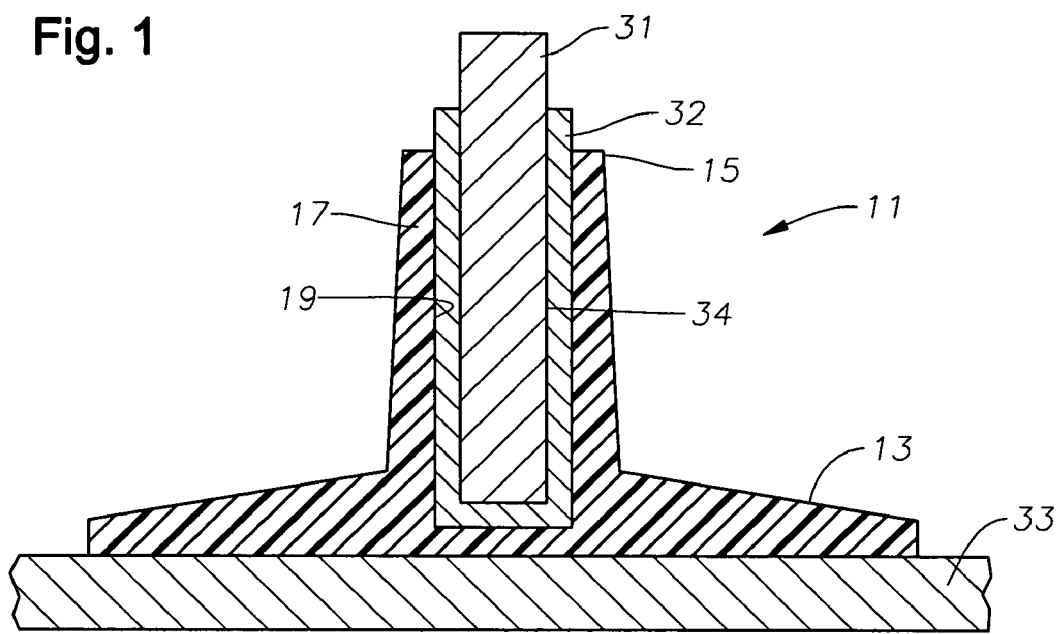
FIG. 1 is a sectional end view of one embodiment of metallic-composite joint constructed in accordance with the present invention.
Figure 2:
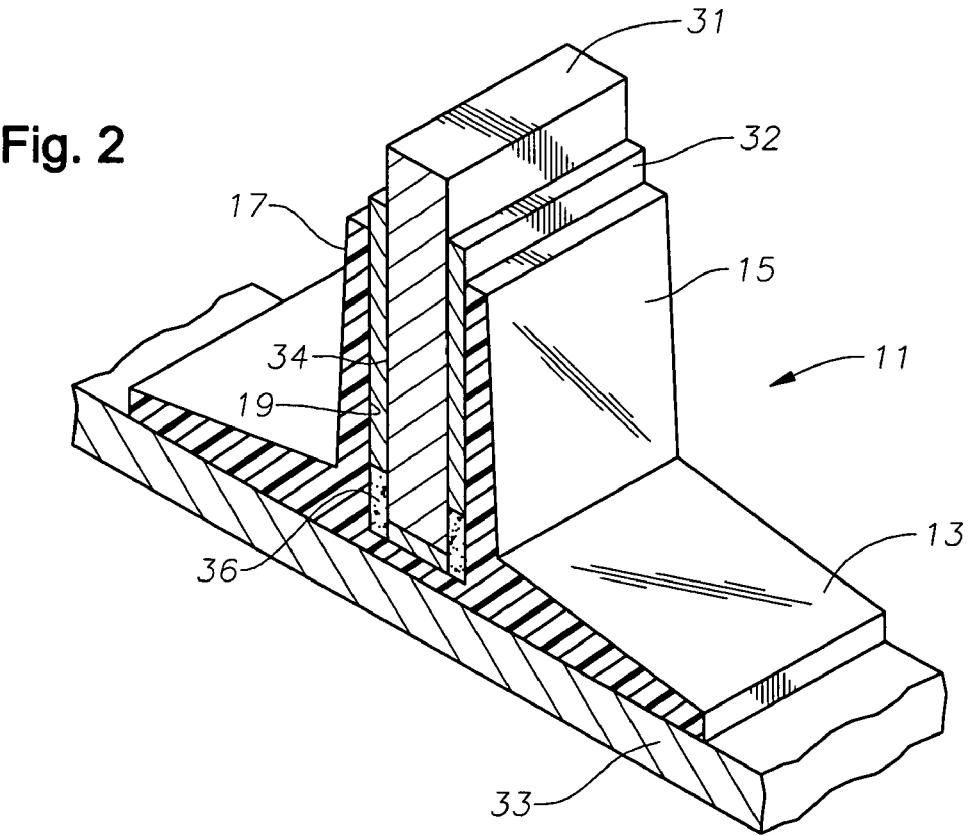
FIG. 2 is an isometric view. of another embodiment of the joint of FIG. 1 and is constructed in accordance with the present invention.

Referring to FIGS. 1 and 2, one embodiment of a system, method, and apparatus for forming a compliant, non-corrosive interface or joint between metallic and composite materials is shown. A preformed component or "preform" 11 for a structural support beam is shown. When viewed from the end or in cross-section, preform 11 resembles the Greek letter "pi" having a longitudinal crossbar or base 13 with two longitudinal legs 15, 17 extending therefrom. A channel or slot 19 is defined between the base 13 and legs 15, 17.

In one embodiment, preform 11 is a composite material that is formed by weaving or braiding continuous bundles or tows of structural fibers. The tows of fibers may be oriented to extend continuously throughout each segment of preform 11 including base 13 and legs 15, 17. The fiber preforms may be formed to provide any desired fiber architecture needed to impart chosen load-carrying capability and to accommodate any desired web plate thickness. Preform 11 may be impregnated with a suitable thermoset resin that acts as an adhesive to bond together two dissimilar materials. The resin is structurally reinforced with the filaments and/or fibers oriented in x, y, and z directions in such a manner as to provide coupling strength between the joined members.

Alternatively, preform 11 may be unimpregnated so that resin may be infused at a later step of the overall manufacturing process. In the latter embodiment, preform 11 is constructed by weaving or braiding the filaments in such a way that the process is not inhibited. After curing, preform 11 may be machined as needed by an appropriate method to provide desired edge straightness, smoothness, and dimensional control.

Preform 11 is used to join a first member 31, such as a metallic member, beam, plate, etc., to a composite member 33, such as a panel of aircraft skin. In the embodiment shown, metallic member 31 forms the web of a structural support member for composite member 33. A compliant member 32 is located between member 31 and preform 11. In other embodiments, a compliant member 32 also may be located between member 33 and preform 11. In addition, member 31 may be a composite material and member 33 may be metallic. Members 31, 33 can be joined at other angles relative to each other because the fibrous preform 11 is flexible prior to curing the resin.

For example, in one embodiment the present invention comprises a joint for dissimilar materials. The joint has a preform 11 formed from a composite material and having a pi-shape in cross-section, including a base 13 and legs 15, 17 projecting from the base 13 to define a slot 19 between the base 13 and the legs 15, 17. A metallic member 31 formed from a metallic material is located in the slot 19 of the preform 11. A composite member 33 formed from a composite material is joined to the base 13 of the preform 11.

A compliant member 32 is located in the slot 19 of the preform 11 between the metallic member 31 and the preform 11. The compliant member 32 has a coefficient of thermal expansion that is similar to that of the preform 11 to reduce the risk of separation therebetween when subjected to thermal stresses, such that the compliant member 32 acts as a ductile layer to absorb a greater thermal expansion of the metallic member 31 against a lesser thermal expansion of the composite member 33 as thermal energy is applied thereto.

The compliant member 32 may be formed from an inert material and also acts as a barrier. to galvanic corrosion that might otherwise occur between carbon in the preform 11 and the metallic member 31. In another embodiment, a sealant 34 is located between the compliant member 32 and the metallic member 31 for additional resistance to galvanic corrosion. The compliant member 32 may comprise a sleeve that is contoured to an outer surface of the metallic member 31 and an inner surface of the slot 19 in the preform 11. The compliant member 32 may be bonded to the preform 31 with a material selected from a resin binder and an adhesive. Alternatively, the compliant member 32 may be deposited as a coating on at least a portion of the metallic member 31. Moreover, the compliant layer 32 may be discontinuous. Any gaps in the compliant layer 32 between the preform 11 and the metallic member 31 may be filled with a material 36 (FIG. 2) such as a sealant or adhesive.

In one embodiment, the preform 11 is woven, at least a portion of the metallic member 31 is formed from aluminum, and the composite member 33 is a frame member of an aircraft. In another embodiment, at least a portion of the compliant member 32 is formed from titanium, and the preform 11 is formed from woven carbon fiber in a binder of resin.

Referring now to FIG. 3, the present invention also comprises method of fabricating a joint. One embodiment, of the method begins as indicated in step 51, and comprises providing a preform having a slot (step 53); joining a composite member to the preform (step 55); positioning a compliant member on a metallic member to form a sub-assembly (step 57); locating the sub-assembly in the slot of the preform such that the compliant member is located between the preform and the metallic member, the compliant member having a coefficient of thermal expansion that is similar to that of the preform to reduce a risk of separation therebetween when subjected to thermal stresses, such that the compliant member acts as a ductile layer to absorb a greater thermal expansion of the metallic member against a lesser thermal expansion of the composite member as thermal energy is applied thereto (step 59); before ending as indicated at step 61.

The method may further comprise forming the preform from a composite material with a pi-shaped cross-section having a base and legs projecting from the base to define the slot therebetween; and/or forming the compliant member as a sleeve that is contoured to an outer surface of the metallic member and an inner surface of the slot in the preform; and/or depositing the compliant member as a coating on at least a portion of the metallic member.

The method may still further comprise bonding the compliant member to the preform with a material selected from a resin binder and an adhesive; and/or forming the compliant member from an inert material that is a barrier to galvanic corrosion that might otherwise occur between carbon in the preform and the metallic member; and/or providing a sealant between the compliant member and the metallic member for additional resistance to galvanic corrosion; and/or weaving the preform, forming the metallic member from aluminum, and forming the composite member as an aircraft frame member; and/or forming the compliant member from titanium, and the preform from woven carbon fiber in a binder of resin; and/or one of curing the preform prior to step (d), and curing the preform after step (d).

While the invention has been shown or described in only some of its forms, it should be apparent to those skilled in the art that it is not so limited, but is susceptible to various changes without departing from the scope of the invention.

What is claimed is:

1. A method of fabricating a joint, comprising:
   (a) providing a preform having a base and two legs defining between them a slot, the preform being formed of a woven fiber composite material;
   (b) joining a composite member to the base of the preform;
   (c) providing an aluminum member having two oppositely-facing sides,
   (d) adhering a single layer of titanium to each of the sides of the aluminum member to form a sub assembly; and
   (e) bonding the sub-assembly in the slot of the preform with the titanium being between the legs of the preform and the aluminum member and separating the aluminum member from contact with the preform, the titanium having a coefficient of thermal expansion that is similar to that of the preform to reduce a risk of separation therebetween when subjected to thermal stresses, such that the titanium acts as a ductile layer to absorb a greater thermal expansion of the aluminum member against a lesser thermal expansion of the composite member as thermal energy is applied thereto.

2. A method according to claim 1, wherein the layer of titanium is in contact with the aluminum member.

3. A method according to claim 1, further comprising forming the layer of titanium as a sleeve that is contoured to an outer surface of the aluminum member and an inner surface of the slot in the preform.

4. A method according to claim 1, wherein step (d) comprises depositing the layer of titanium as a coating on at least a portion of the aluminum member.

5. A method according to claim 1, wherein the subassembly is bonded to the preform with a material selected from a resin binder and an adhesive.

6. A method according to claim 1, further comprising providing a sealant between the layer of titanium and the aluminum member, preventing any contact of the layer of titanium with the aluminum member.

7. A method according to claim 1, further comprising providing at least one gap in the slot wherein the layer of titanium is not located between the aluminum member and the preform, and filling said at least one gap with a material selected from the group consisting of sealants and adhesives.

8. A method of fabricating a joint, comprising:
(a) providing a preform having a slot, and forming the preform from a composite material with a pi-shaped cross-section having a base and legs projecting from the base to define the slot therebetween;
(b) joining a composite member to the base of the preform;
(c) positioning a compliant member on a metallic member to form a sub-assembly by depositing the compliant member as a coating directly on and in contact with at least a portion of the metallic member; and
(d) locating the sub-assembly in the slot of the preform such that the compliant member is located between the preform and the metallic member, separating the metallic member from contact with the preform, the compliant member having a coefficient of thermal expansion that is similar to that of the preform to reduce a risk of separation therebetween when subjected to thermal stresses, such that the compliant member acts as a ductile layer to absorb a greater thermal expansion of the metallic member against a lesser thermal expansion of the composite member as thermal energy is applied thereto.

9. A method according to claim 8, further comprising bonding the compliant member to the preform with a material selected from a resin binder and an adhesive.

10. A method according to claim 8, further comprising forming the compliant member from an inert material that is a barrier to galvanic corrosion that might otherwise occur between carbon in the preform and the metallic member.

11. A method according to claim 8, further comprising:
forming the metallic member from aluminum, and forming the composite member as an aircraft frame member; and
forming the compliant member from titanium, and the preform from woven carbon fiber in a binder of resin.

12. A method according to claim 8, further comprising:
providing at least one gap in the slot wherein the compliant member is not located between the metallic member and the preform, and filling said at least one gap with a material selected from the group consisting of sealants and adhesives.

13. A method of fabricating a joint, comprising:
(a) providing a preform of woven carbon fiber and having a slot;
(b) joining a composite member to a part of the preform other than the slot;
(c) positioning a compliant member on a metallic member to form a sub-assembly, forming the compliant member from a single layer of an inert material that is a barrier to galvanic corrosion that might otherwise occur between carbon fiber in the preform and the metallic member, and providing a sealant between the compliant member and the metallic member, preventing contact of the compliant member with the metallic member; and
(d) locating the sub-assembly in the slot of the preform such that the compliant member is located between the preform and the metallic member, preventing contact of the preform with the metallic member, the compliant member having a coefficient of thermal expansion that is similar to that of the preform to reduce a risk of separation therebetween when subjected to thermal stresses, such that the compliant member acts as a ductile layer to absorb a greater thermal expansion of the metallic member against a lesser thermal expansion of the composite member as thermal energy is applied thereto.

14. A method according to claim 13, further comprising:
forming the preform from a composite material with a pi-shaped cross-section having a base and legs projecting from the base to define the slot therebetween;
forming the compliant member as a sleeve that is contoured to an outer surface of the metallic member and an inner surface of the slot in the preform; and
bonding the compliant member to the preform with a material selected from a resin binder and an adhesive.

15. A method according to claim 13, further comprising:
forming the compliant member from titanium.

16. A method according to claim 13, further comprising providing at least one gap in the slot wherein the compliant member is not located between the preform and the metallic member, and filling said at least one gap with a material selected from the group consisting of sealants and adhesives.

* * * * *

UNITED STATES PATENT AND TRADEMARK OFFICE
CERTIFICATE OF CORRECTION

| | |
|---|---|
| PATENT NO. | : 7,611,595 B2 |
| APPLICATION NO. | : 11/345473 |
| DATED | : November 3, 2009 |
| INVENTOR(S) | : John E. Barnes |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Twelfth Day of October, 2010

David J. Kappos
*Director of the United States Patent and Trademark Office*